(12) United States Patent
Takano et al.

(10) Patent No.: US 11,243,080 B2
(45) Date of Patent: Feb. 8, 2022

(54) SELF-POSITION ESTIMATION METHOD AND SELF-POSITION ESTIMATION DEVICE

(71) Applicant: Nissan Motor Co., Ltd., Yokohama (JP)

(72) Inventors: Hiroyuki Takano, Kanagawa (JP); Yasuhito Sano, Kanagawa (JP); Chikao Tsuchiya, Kanagawa (JP); Takuya Nanri, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 16/320,307

(22) PCT Filed: Jul. 26, 2016

(86) PCT No.: PCT/JP2016/071922
§ 371 (c)(1),
(2) Date: Jan. 24, 2019

(87) PCT Pub. No.: WO2018/020589
PCT Pub. Date: Feb. 1, 2018

(65) Prior Publication Data
US 2019/0265040 A1    Aug. 29, 2019

(51) Int. Cl.
*G06K 9/00* (2006.01)
*G06T 7/00* (2017.01)
(Continued)

(52) U.S. Cl.
CPC ........... *G01C 21/165* (2013.01); *G01C 21/28* (2013.01); *G01C 21/30* (2013.01);
(Continued)

(58) Field of Classification Search
None
See application file for complete search history.

(56) References Cited

U.S. PATENT DOCUMENTS

| 5,367,458 A | * | 11/1994 | Roberts | ............... G01C 15/002 |
| | | | | 180/169 |
| 2005/0270374 A1 | * | 12/2005 | Nishida | ..................... G06T 7/12 |
| | | | | 348/148 |

(Continued)

FOREIGN PATENT DOCUMENTS

| JP | 2003252149 A | 9/2003 |
| JP | 2008250906 A | 10/2008 |

(Continued)

*Primary Examiner* — Adam D Tissot
*Assistant Examiner* — Laura E Linhardt
(74) *Attorney, Agent, or Firm* — Young Basile Hanlon & MacFarlane, P.C.

(57) ABSTRACT

A self-position estimation method includes: detecting a relative position of each target existing around a moving body relative to the moving body; estimating a movement amount of the moving body; correcting the relative position on a basis of the movement amount of the moving body and accumulating the corrected relative position as target position data; detecting a slope amount of a traveling road of the moving body; selecting, from among the accumulated target position data, the target position data of one or more targets in one or more sections having a slope amount less than a threshold value; and collating the selected target position data with map information indicating positions of the targets on a two-dimensional map to estimate a present position of the moving body.

11 Claims, 9 Drawing Sheets

(51) Int. Cl.
  *G01C 21/28*   (2006.01)
  *G01C 21/16*   (2006.01)
  *G01S 5/16*    (2006.01)
  *G01C 21/36*   (2006.01)
  *G05D 1/02*   (2020.01)
  *G01C 21/30*   (2006.01)

(52) U.S. Cl.
  CPC ............ *G01C 21/3602* (2013.01); *G01S 5/16* (2013.01); *G05D 1/0248* (2013.01); *G06K 9/00798* (2013.01)

(56) References Cited

U.S. PATENT DOCUMENTS

| | | |
|---|---|---|
| 2011/0307204 A1 | 12/2011 | Cho |
| 2017/0024617 A1* | 1/2017 | Yamaguchi ................ G06T 7/73 |
| 2017/0356720 A1* | 12/2017 | Guthrie .................. G01S 17/42 |
| 2018/0285660 A1* | 10/2018 | Ohara ................... G06K 9/3233 |
| 2019/0161082 A1* | 5/2019 | Fairgrieve ............ B60W 10/22 |
| 2019/0202434 A1* | 7/2019 | Ito ................... B60W 30/18127 |

FOREIGN PATENT DOCUMENTS

| | | |
|---|---|---|
| JP | 2012008706 A | 1/2012 |
| JP | 2012103858 A | 5/2012 |
| JP | 2016017758 A | 2/2016 |
| KR | 10-2011-0134633 A | 12/2011 |

\* cited by examiner

FIG. 3
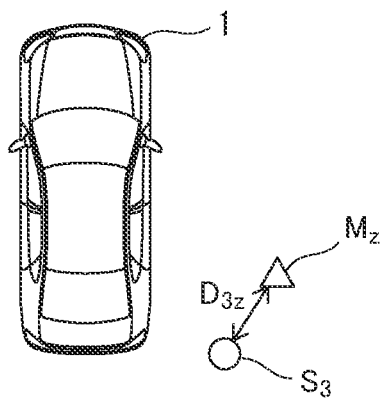
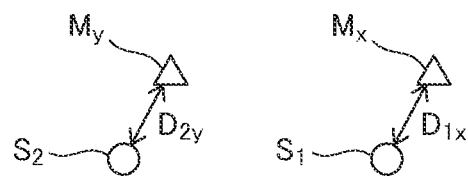
FIG. 4
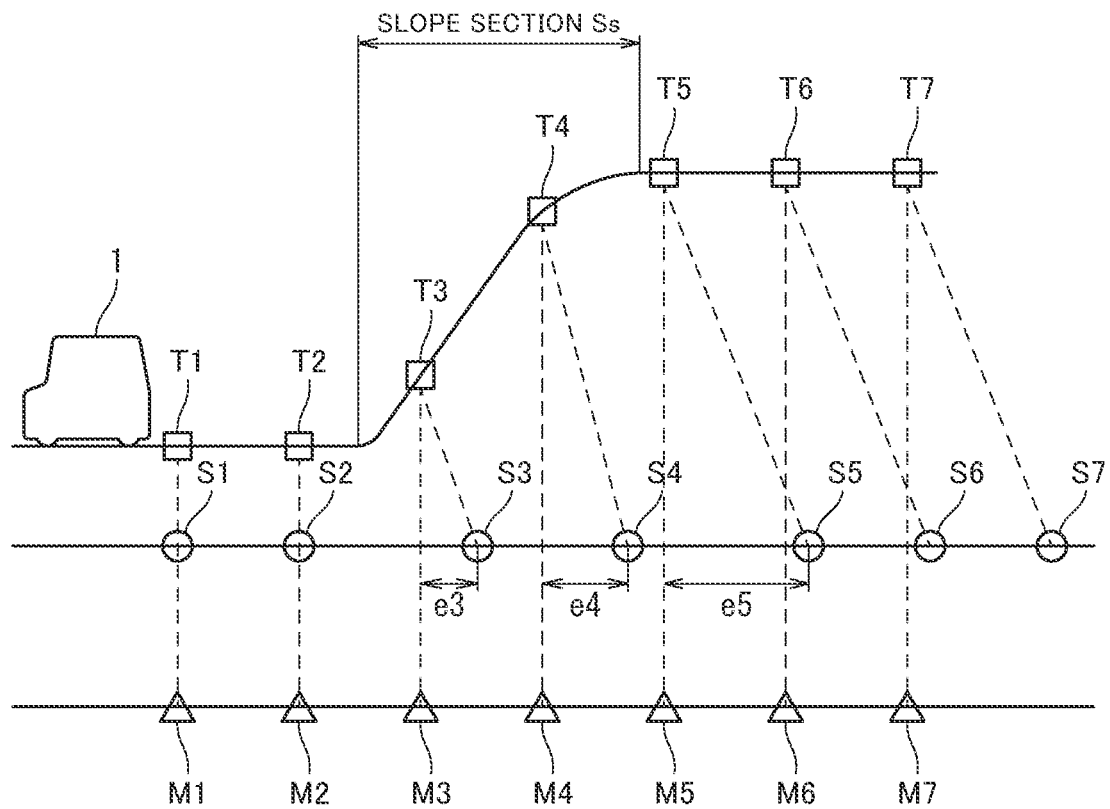

SELF-POSITION ESTIMATION METHOD AND SELF-POSITION ESTIMATION DEVICE

TECHNICAL FIELD

The present invention relates to a self-position estimation method and a self-position estimation device.

BACKGROUND

A technology described in Japanese Patent Application Publication No. JP 2008-250906 A is known as a technology for estimating the position of a moving body by detecting a relative position between a known target and the moving body.

A robot described in Japanese Patent Application Publication No. JP 2008-250906 A corrects an estimation result of a self-position of the robot on the basis of a positional displacement amount between an environment map indicating a movable region by point group data and ambient environment information indicating a detection result of a laser range sensor mounted in the robot by point group data.

In a slope section, there is a difference between an oblique distance and a horizontal distance, and thus, accuracy of position estimation for a moving body on a two-dimensional map may be reduced.

It is an object of the present invention to suppress reduction in the accuracy of position estimation on a two-dimensional map due to a difference between an oblique distance and a horizontal distance in a slope section.

SUMMARY

According to an aspect of the present invention, there is provided a self-position estimation method including: detecting a relative position of a target existing around a moving body relative to the moving body; correcting the relative position on a basis of a movement amount of the moving body and accumulating the corrected relative position as target position data. From among the accumulated target position data, the target position data of one or more targets in one or more sections having a slope amount less than a threshold value is collated with map information indicating positions of the targets on a two-dimensional map to estimate a present position of the moving body.

The object and advantages of the invention will be realized and attained by means of the elements and combinations particularly pointed out in the claims. It is to be understood that both the foregoing general description and the following detailed description are exemplary and explanatory and are not restrictive of the invention.

BRIEF DESCRIPTION OF THE DRAWINGS

FIG. 3 is an illustrative diagram of one example of a self-position estimation method by collation between target position data and map information;

FIG. 4 is an illustrative diagram of errors in target position data due to a slope;

DETAILED DESCRIPTION

Hereinafter, embodiments of the present invention will be described with reference to the drawings.

First Embodiment (Structure)

Figure 1:
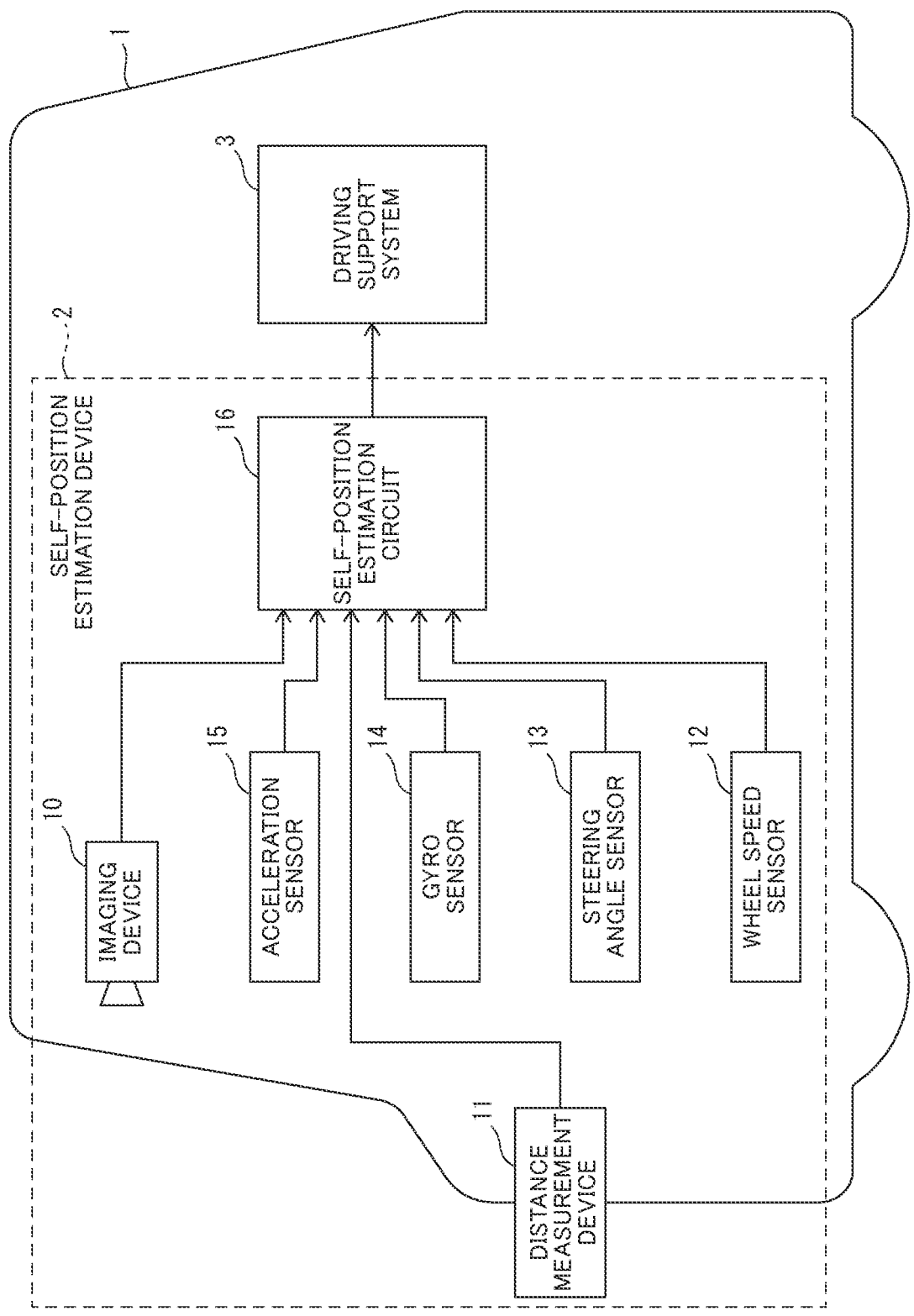
FIG. 1 is a block diagram of one example of the schematic structure of a vehicle mounted with a self-position estimation device of an embodiment.

Reference will be made to FIG. 1. While the following description will be given of estimation of a present position of a vehicle as one example of a moving body, the present invention is widely applicable to estimation of present positions of various moving bodies, including but not limited to vehicles.

A vehicle 1 is mounted with a self-position estimation device 2 and a driving support system 3. The self-position estimation device 2 includes an imaging device 10, a distance measurement device 11, a wheel speed sensor 12, a steering angle sensor 13, a gyro sensor 14, an acceleration sensor 15, and a self-position estimation circuit 16.

The imaging device 10 is mounted in an inside of a vehicle cabin or the like of the vehicle 1, and captures an image of, for example, a region ahead of the vehicle 1. The imaging device 10 may be, for example, a wide-angle camera. The imaging device 10 outputs the captured image of the region ahead of the vehicle 1 to the self-position estimation circuit 16.

The distance measurement device 11 is mounted to an outside of the vehicle cabin or the like of the vehicle 1, applies an electromagnetic wave to the region ahead of the vehicle 1, and detects a reflected wave therefrom. The distance measurement device 11 may be, for example, a laser range finder. In addition, a mounting position for the distance measurement device 11 may be, for example, around the bonnet, the bumper, the license plate, a headlight, or a side mirror of the vehicle 1. The distance measurement device 11 outputs a measurement result to the self-position estimation circuit 16.

The wheel speed sensor 12 generates a preset number of wheel speed pulses every time each wheel of the vehicle 1 rotates one time. The wheel speed sensor 12 outputs the wheel speed pulses to the self-position estimation circuit 16.

The steering angle sensor 13 is mounted, for example, onto a steering column configured to rotatably support a steering wheel of the vehicle 1. The steering angle sensor 13 detects a present steering angle that is a present rotation angle (a steering operation amount) of the steering wheel that is a steering operator. The steering angle sensor 13 outputs the detected present steering angle to the self-position estimation circuit 16.

The gyro sensor 14 detects a yaw rate, a displacement amount in a pitch direction, and a displacement amount in a roll direction that are generated in the vehicle 1. The gyro sensor 14 outputs the detected yaw rate, displacement amount in the pitch direction, and displacement amount in the roll direction to the self-position estimation circuit 16.

The acceleration sensor 15 detects a lateral G that is an acceleration/deceleration in a vehicle widthwise direction and an acceleration/deceleration in a front-rear direction that are generated in the vehicle 1. The acceleration sensor 15 outputs the detected lateral G and the detected acceleration/deceleration in the front-rear direction to the self-position estimation circuit 16.

The self-position estimation circuit 16 is an electronic circuit device including a processor such as a central processing unit (CPU), a storage device, and peripheral components.

The self-position estimation circuit 16 estimates a present position of the vehicle 1 on a map on the basis of signals received from the imaging device 10, the distance measurement device 11, the wheel speed sensor 12, the steering angle sensor 13, and the gyro sensor 14 and two-dimensional map information indicating a position of a known target on a two-dimensional map. Hereinafter, the present position of the vehicle 1 on the map may be referred to as "self-position". The self-position estimation circuit 16 outputs a self-position signal indicating the self-position to the driving support system 3.

The driving support system 3 performs driving support for driving of the vehicle 1 by a driver by using the self-position indicated by the self-position signal received from the self-position estimation circuit 16.

One example of the driving support may be, for example, provision of information such as an alarm to the driver. The driving support system 3 may control at least one of the type and intensity of the alarm to be issued to the driver in accordance with the self-position of the vehicle 1.

One example of the driving support may be control of a traveling state of the vehicle 1 including at least one of braking control, acceleration control, and steering control of the vehicle 1. For example, the driving support system 3 may determine whether to generate braking force or driving force in the vehicle 1 in accordance with the self-position of the vehicle 1.

Figure 2:
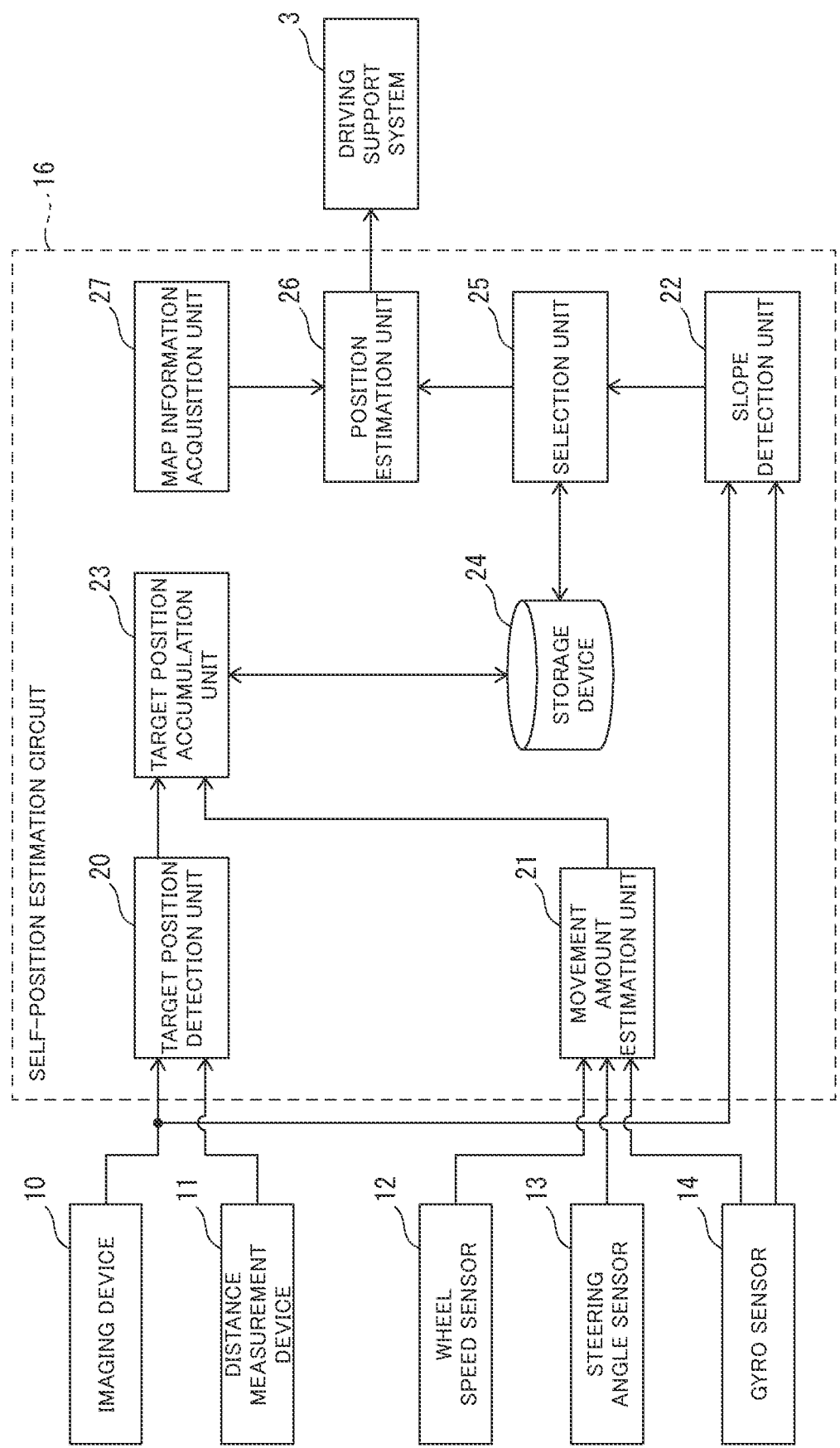
FIG. 2 is a block diagram of one example of the schematic structure of a self-position estimation circuit.

Next, the structure of the self-position estimation circuit 16 will be described. Reference will be made to FIG. 2. The self-position estimation circuit 16 includes a target position detection unit 20, a movement amount estimation unit 21, a slope detection unit 22, a target position accumulation unit 23, a storage device 24, a selection unit 25, a position estimation unit 26, and a map information acquisition unit 27.

The processor included in the self-position estimation circuit 16 executes a computer program stored in the storage device 24 to achieve functions of the target position detection unit 20, the movement amount estimation unit 21, the slope detection unit 22, the target position accumulation unit 23, the selection unit 25, the position estimation unit 26, and the map information acquisition unit 27.

The target position detection unit 20 receives the captured image of the region ahead of the vehicle 1 produced by the imaging device 10. Additionally, the target position detection unit 20 receives the measurement result of the distance measurement device 11.

The target position detection unit 20 detects each target existing around the vehicle 1 on the basis of the captured image of the region ahead of the vehicle 1 and the measurement result of the distance measurement device 11. For example, the target position detection unit 20 detects each target existing ahead of the vehicle 1.

In addition, the target position detection unit 20 detects a relative position of each target relative to the vehicle 1. The target position detection unit 20 outputs a relative position signal indicating the detected relative position to the target position accumulation unit 23.

Herein, the target may be, for example, a line (such as a lane marking) on a traveling road surface where the vehicle 1 is traveling, a curb of a road shoulder, a guardrail, or the like.

The movement amount estimation unit 21 receives the wheel speed pulses, the present steering angle, and the yaw rate, respectively, from the wheel speed sensor 12, the steering angle sensor 13, and the gyro sensor 14. On the basis of the signals received from the wheel speed sensor 12, the steering angle sensor 13, and the gyro sensor 14, the movement amount estimation unit 21 estimates, by odometry, a movement amount $\Delta P$ of the vehicle 1 up to the present from the time point when the self-position of the vehicle 1 is estimated in a previous processing cycle. The movement amount estimation unit 21 outputs a movement amount signal indicating the estimated movement amount $\Delta P$ to the target position accumulation unit 23.

The slope detection unit 22 receives the displacement amount in the pitch direction from the gyro sensor 14.

On the basis of the displacement amount in the pitch direction received from the gyro sensor 14, the slope detection unit 22 detects a slope amount of a traveling road of the vehicle 1, i.e., an inclination of a direction in which the vehicle 1 is traveling.

In addition, the slope detection unit 22 may receive the captured image of the region head of the vehicle 1 produced by the imaging device 10. The slope detection unit 22 may detect the slope amount of the traveling road of the vehicle 1 on the basis of a 3D point group flow by analyzing the captured image.

The slope detection unit 22 determines whether or not the traveling road of the vehicle 1 is a slope section. For example, when the slope amount of the traveling road of the vehicle 1 is equal to or more than a predetermined threshold value, the slope detection unit 22 may determine that the traveling road is a slope section. The slope detection unit 22 outputs a determination result signal indicating the determination result to the selection unit 25.

The target position accumulation unit 23 receives the relative position signal from the target position detection unit 20, and receives the movement amount signal from the movement amount estimation unit 21.

The target position accumulation unit 23 accumulates the relative position of the target around the vehicle 1 indicated by the relative position signal in the storage device 24.

In addition, the target position accumulation unit 23 corrects a relative position of the target accumulated in the past to a relative position relative to the present position of the vehicle 1 by using an elapsed time up to the present and the movement amount $\Delta P$ indicated by the movement amount signal. In other words, the target position accumulation unit 23 moves the relative position in a direction opposite to the moving direction of the vehicle 1 by the movement amount $\Delta P$ in which the vehicle has moved during the elapsed time up to the present.

The target position accumulation unit 23 accumulates data of a target position (which may be hereinafter referred to as "target position data") that is the corrected relative position in the storage device 24.

When the target position data is already accumulated in the storage device 24, the target position accumulation unit 23 updates the accumulated target position data by using the movement amount ΔP indicated by the movement amount signal. In other words, the target position accumulation unit 23 moves the relative position of the accumulated target position data in the direction opposite to the moving direction of the vehicle 1 by the movement amount ΔP. Then, the target position accumulation unit 23 overwrites the relative position relatively moved by the movement amount ΔP on the accumulated target position data.

The selection unit 25 selects target position data to be used for estimation of the self-position of the vehicle 1 from among the target position data accumulated in the storage device 24. The target position data to be selected for use in estimation of the self-position may be hereinafter referred to as "selected target position data"

Processing for selecting the selected target position data by the selection unit 25 will be described later.

The position estimation unit 26 collates the selected target position data with two-dimensional map information acquired by the map information acquisition unit 27 to estimate the self-position of the vehicle 1.

The map information acquisition unit 27 acquires map data and the two-dimensional map information that indicates a position on a two-dimensional map of each target existing on the map data. For example, the map information acquisition unit 27 is a car navigation system, a map database, or the like. Note that the map information acquisition unit 27 may acquire the two-dimensional map information from outside via a communication system such as wireless communication (road-to-vehicle communication or vehicle-to-vehicle communication is also possible). In this case, the map information acquisition unit 27 may periodically acquire latest two-dimensional map information to update the possessed two-dimensional map information. Additionally, the map information acquisition unit 27 may accumulate, as two-dimensional map information, positional information of targets detected on a traveling road where the vehicle 1 actually traveled.

The position estimation unit 26 may estimate the self-position of the vehicle 1 by collating the selected target position data with the two-dimensional map information, for example, by data collation processing as below.

Reference will be made to FIG. 3. Reference sign $S_i$ denotes selected target position data. Index i is an integer of from 1 to N, and N is the number of pieces of the selected target position data.

The position estimation unit 26 determines a tentative position of the vehicle 1 by correcting the self-position estimated in the previous processing cycle by the movement amount ΔP.

The position estimation unit 26 assumes that the position on the two-dimensional map of the vehicle 1 is the tentative position, and converts the relative position of the target indicated by the selected target position data $S_i$ to an absolute position on the two-dimensional map. The position estimation unit 26 selects positional information $M_j$ of the target in the two-dimensional map information closest to the absolute position of the selected target position data $S_i$. In an example of FIG. 3, positional information $M_x$ is closest to selected target position data $S_1$, positional information $M_y$ is closest to selected target position data $S_2$, and positional information $M_z$ is closest to selected target position data $S_3$.

The position estimation unit 26 calculates a distance $D_{ij}$ between the selected target position data $S_i$ and the positional information $M_j$ closest to the data, and calculates an average S of the distance $D_{ij}$ by using the following formula (1):

[Math. 1]

$$S = \frac{1}{N}\sum_{i=1}^{N} D_{ij} \quad (1)$$

The position estimation unit 26 calculates a position and a posture of the vehicle 1 having a minimum average S by numerical analysis, and determines as estimated values for the self-position of the vehicle 1. The position estimation unit 26 outputs the estimated values for the self-position to the driving support system 3.

(Method for Selecting Selected Target Position Data)

Next will be a description of processing for selecting the selected target position data by the selection unit 25.

As described above, in a slope section, there is a difference between the oblique distance and the horizontal distance. Due to this, the distance between the vehicle 1 and a target indicated by the target position data of the target detected before passing through the slope section may be longer than an actual horizontal distance. The reason for that will be described with reference to FIG. 4.

The upper stage is a schematic diagram illustrating a traveling road of the vehicle 1 including a slope section Ss and targets on the traveling road. Square plots T1 to T7 represent the targets on the traveling road. The position of the vehicle 1 in FIG. 4 indicates a position at a time point after having passed through the slope section.

The middle stage is a schematic diagram illustrating a distance between the vehicle 1 and each target indicated by target position data accumulated in the storage device 24 at the time point after having passed through the slope section. Circular plots S1 to S7 correspond to pieces of the target position data of the targets T1 to T7.

The lower stage is a schematic diagram illustrating a distance between each of the targets T1 to T7 and the vehicle 1 on a two-dimensional map. Triangular plots M1 to M7 represent positions of the targets T1 to T7 on the map.

In the slope section Ss, the oblique distance is longer than the horizontal distance. Due to this, the target position data of the targets T1 to T7 accumulated in the past are corrected at the position of the vehicle 1 at the time point after having passed through the slope section in FIG. 4 by using the movement amount ΔP including a movement amount in the slope section Ss. Thus, distances between the vehicle 1 and the targets indicated by the target position data S3 to S7 of the targets T3 to T7 in a section before passing through the slope section Ss are longer than distances on the two-dimensional map (i.e., the horizontal distances).

For example, regarding the targets T3 and T4 in the slope section Ss, differences between distances between the vehicle 1 and the targets T3 and T4 indicated by the pieces of the target position data S3 and S4 and distances on the two-dimensional map are e3 and e4, respectively, in which e4 is longer than e3.

Regarding the targets T5 to T7 in a flat section before entering the slope section Ss, relative positions of the targets T5 to T7 indicated by the pieces of the target position data S5 to S7 are all similarly shifted backward by a difference e5 between the oblique distance and the horizontal distance in the slope section Ss. Additionally, the relative positions between the pieces of the target position data S5 to S7 do not change.

On the other hand, the pieces of the target position data S1 to S2 of the targets T1 to T2 in a flat section after having passed through the slope section Ss are not corrected by using the movement amount ΔP estimated in the slope section Ss. Thus, there are no differences between distances between the vehicle 1 and the targets T1 and T2 indicated by the pieces of the target position data S1 to S2 and the distances on the two-dimensional map. In addition, a relative position between the pieces of the target position data S1 and S2 also does not change.

When such pieces of the target position data S1 to S7 are collated with the two-dimensional map information, the pieces of the target position data S1 to S2 in the flat section after having passed through the slope section, where the relative position between the targets does not change, and the pieces of the target position data S5 to S7 in the flat section before entering the slope section, where the relative position between the targets does not change, match well with position information on the map.

Due to this, estimating the self-position so as to minimize the average S of the distance $D_{ij}$ between the target position data and the position information on the map makes small also the distances between the target position data S5 to S7 before entering the slope section Ss and the position information on the map, so that estimation error may not be small.

Additionally, for some time until the target position data after having passed through the slope section Ss are accumulated, the target position data before entering the slope section Ss are larger in amount than the target position data after having passed through the slope section Ss. Thus, the target position data before entering the slope section Ss dominantly influence, which may make an estimation error large. As a result, when the vehicle 1 passes through the slope section Ss and enters an intersection, the estimation error becomes large in estimating the self-position by using targets around the intersection, such as a stop line.

Furthermore, due to a difference between an estimated position calculated by the dominant influence of the target position data S1 to S2 after having passed through the slope section and an estimated position calculated by the dominant influence of the target position data S5 to S7 before entering the slope section, error in the estimated position for the self-position may be fluctuated and unstable.

Figure 5:
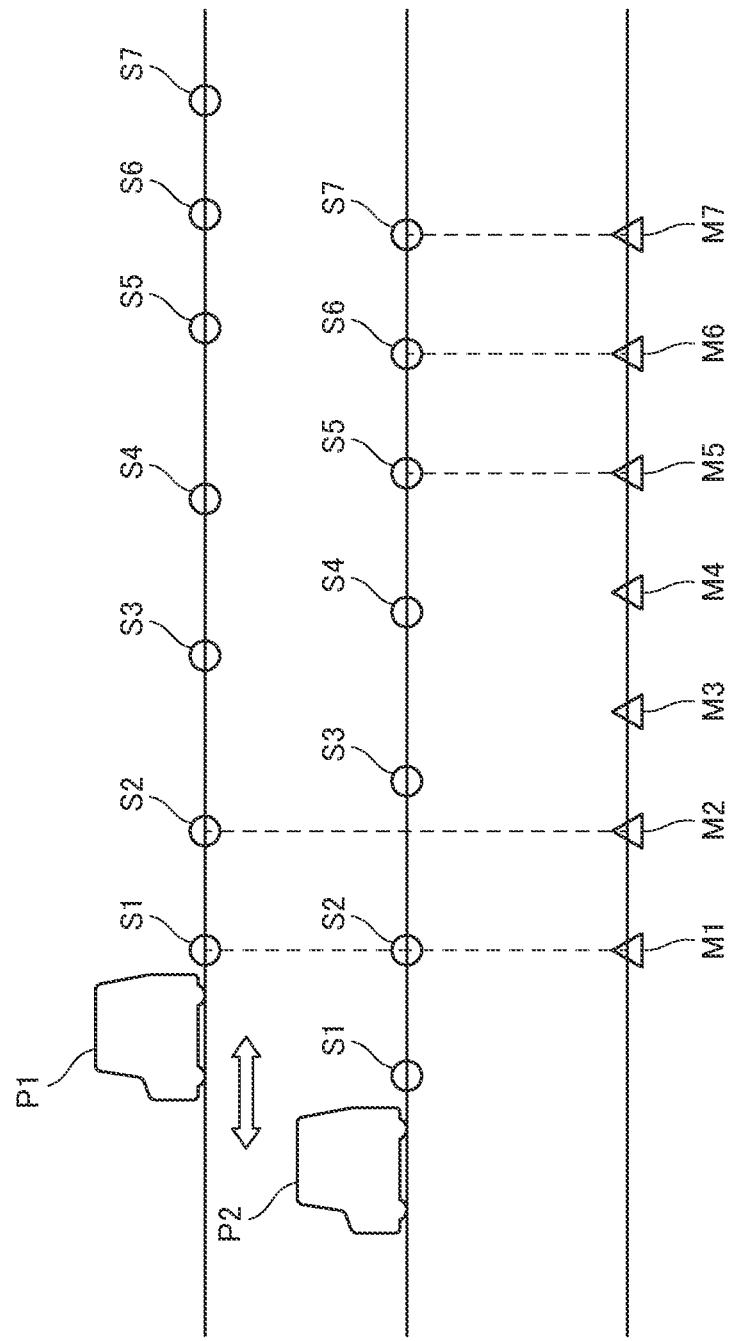
FIG. 5 is an illustrative diagram of a vehicle position estimation error due to the slope.

FIG. 5 illustrates the situation. Reference sign P1 denotes the estimated position calculated by the dominant influence of the target position data S1 to S2 after having passed through the slope section, and reference sign P2 denotes the estimated position calculated by the dominant influence of the target position data S5 to S7 before entering the slope section. Depending on which of the target position data after having passed through the slope section and the target position data before entering the slope section dominantly influence, calculation result may waver unstably between the P1 and the P2.

Then, the selection unit 25 determines whether or not the vehicle 1 has passed the slope section Ss on the basis of the determination result signal from the slope detection unit 22.

When the vehicle 1 has passed through the slope section Ss, the selection unit 25 selects, as the selected target position data, the target position data S1 to S2 after having passed through the slope section (i.e., the target position data of the targets in the section up to the present position after having passed through the slope section). In other words, the selection unit 25 excludes the target position data S3 to S7 before passing through the slope section from the selected target position data.

Figure 6:
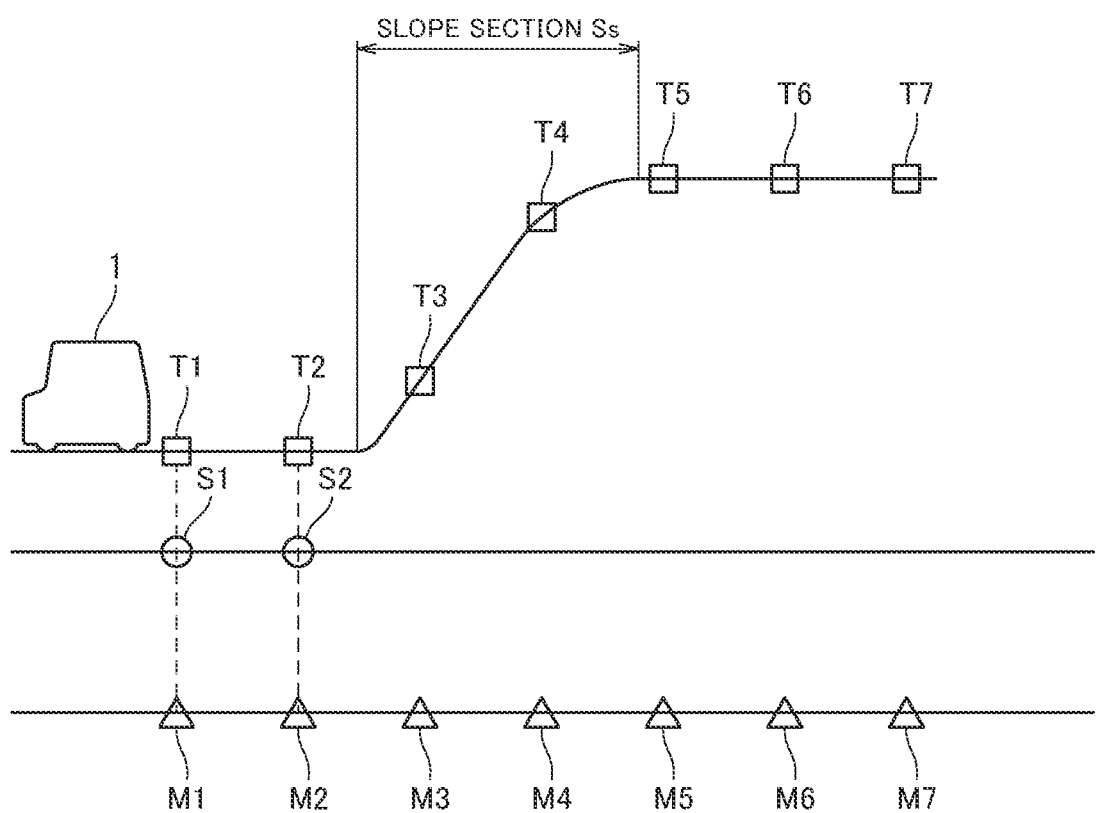
FIG. 6 is an illustrative diagram of selected target position data.

Then, the position estimation unit 26 collates the selected target position data S1 to S2 after having passed through the slope section with the positions M1 to M2 of the targets T1 to T2 on the map to estimate the self-position of the vehicle 1. FIG. 6 illustrates this situation.

Thus, even when the distance between the vehicle 1 and each target indicated by the target position data S3 to S7 of the targets detected before passing through the slope section Ss by traveling of the vehicle 1 in the slope section Ss is longer than the actual horizontal distance, the target position data S3 to S7 can be excluded from position estimation. This can suppress reduction in accuracy of position estimation on the two-dimensional map due to the difference between the oblique distance and the horizontal distance in the slope section.

Note that it is unnecessary to select, as the selected target position data, all pieces of the target position data after having passed through the slope section, and only target position data necessary to enable estimation of the self-position of the vehicle 1 by collation with the map information acquired by the map information acquisition unit 27 may be selected.

In addition, the selection unit 25 may delete the target position data other than the selected target position data (i.e., the target position data before passing through the slope section) from the storage device 24. For example, the selection unit 25 may delete the target position data S3 to S4 in the slope section and the target position data S5 to S7 before entering the slope section from the storage device 24. The position estimation unit 26 may estimate the present position of the vehicle 1 by collating the target position data left in the storage device 24 with the map information indicating the positions of the targets on the map.

By deleting the target position data before passing through the slope section from the storage device 24, the storage region of the storage device 24 can be effectively utilized.

In addition, the selection unit 25 may preferentially select, as the selected target position data, the target position data of a target detected by the target position detection unit 20 after having passed through the slope section, whose an elapsed time from the detection of the target is shorter. For example, the selection unit 25 may select the target detection data of one or more targets around the present position of the vehicle 1 after having passed through the slope section. For example, the selection unit 25 selects the target position data of targets existing within about 20 m from the present position of the vehicle 1. The target position data of one or more targets around the present position of the vehicle 1 tend to have high position accuracy, because there is little accumulation of errors due to correction using the movement amount ΔP. For example, the positional data of a lane and/or a curb, which are road boundaries, are highly accurate in terms of a lateral position within a traveling road.

(Operation)

Figure 7:
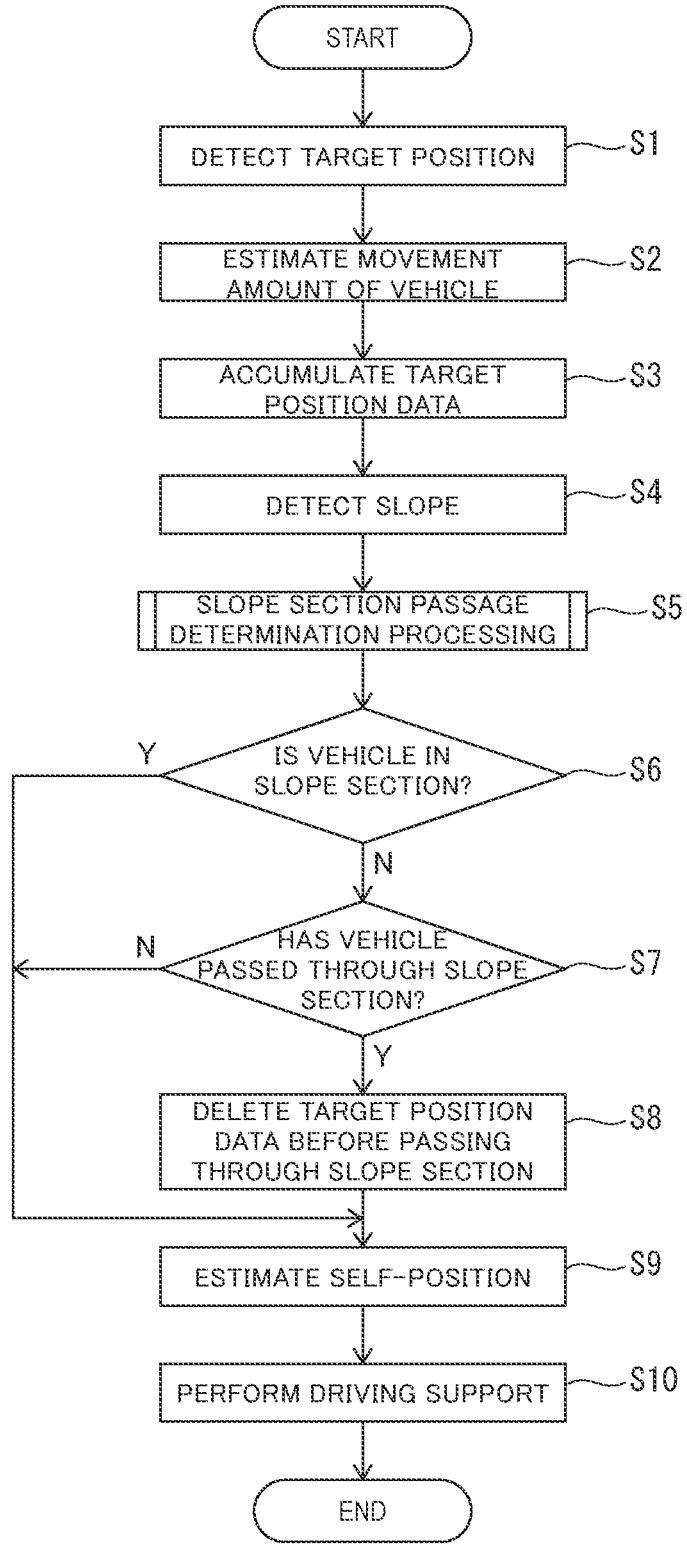
FIG. 7 is a flowchart illustrating one example of a self-position estimation method according to a first embodiment.

Next will be a description of operation of the self-position estimation device 2 according to the first embodiment. Reference will be made to FIG. 7.

At step S1, the imaging device 10, the distance measurement device 11, and the target position detection unit 20 detect the relative position of each target existing around the vehicle 1 relative to the vehicle 1. The target position detection unit 20 outputs a relative position signal indicating the detected relative position to the target position accumulation unit 23.

At step S2, the movement amount estimation unit 21 estimates the movement amount ΔP of the vehicle 1 up to the present from the time point when the self-position of the vehicle 1 is estimated in the previous processing cycle.

At step S3, the target position accumulation unit 23 accumulates the relative position of the each target around the vehicle 1 indicated by the relative position signal in the storage device 24. Additionally, the target portion accumulation unit 23 corrects the relative position of the target accumulated in the past to a relative position relative to the present position of the vehicle 1 by using an elapsed time up to the present and the movement amount ΔP indicated by the movement amount signal, and accumulates as target position data in the storage device 24.

At step S4, the imaging device 10, the gyro sensor 14, and the slope detection unit 22 detect a slope amount of the traveling road of the vehicle 1.

At step S5, the slope detection unit 22 and the selection unit 25 determine whether the vehicle 1 is in a slope section, has not yet entered the slope section, or has passed through the slope section by slope section passage determination processing.

At step S6, the selection unit 25 determines whether or not it has been determined that the vehicle 1 is in the slope section by the slope section passage determination processing. When the vehicle 1 is in the slope section (step S6: Y), the processing goes to step S9. When the vehicle 1 is not in the slope section (step S6: N), the processing goes to step S7.

At step S7, the selection unit 25 determines whether or not it has been determined that the vehicle 1 has passed through the slope section by the slope section passage determination processing. When the vehicle 1 has passed through the slope section (step S7: Y), the processing goes to step S8.

When the vehicle 1 has not yet passed through the slope section (step S7: N), i.e., when the vehicle 1 has not yet entered the slope section, the processing goes to step S9.

At step S8, the selection unit 25 deletes the target position data S3 to S7 before passing through the slope section from the storage device 24. In other words, the selection unit 25 selects the target position data S1 to S2 after having passed through the slope section, and leaves it as the selected target position data in the storage device 24.

At step S9, the position estimation unit 26 collates the selected target position data with map information to estimate the self-position of the vehicle 1. In other words, the position estimation unit 26 estimates the present position of the vehicle 1 by collating the target position data left in the storage device 24 with map information.

At step S10, the driving support system 3 uses the self-position of the vehicle 1 estimated by the position estimation unit 26 to perform driving support for driving of the vehicle 1 by a driver.

Figure 8:
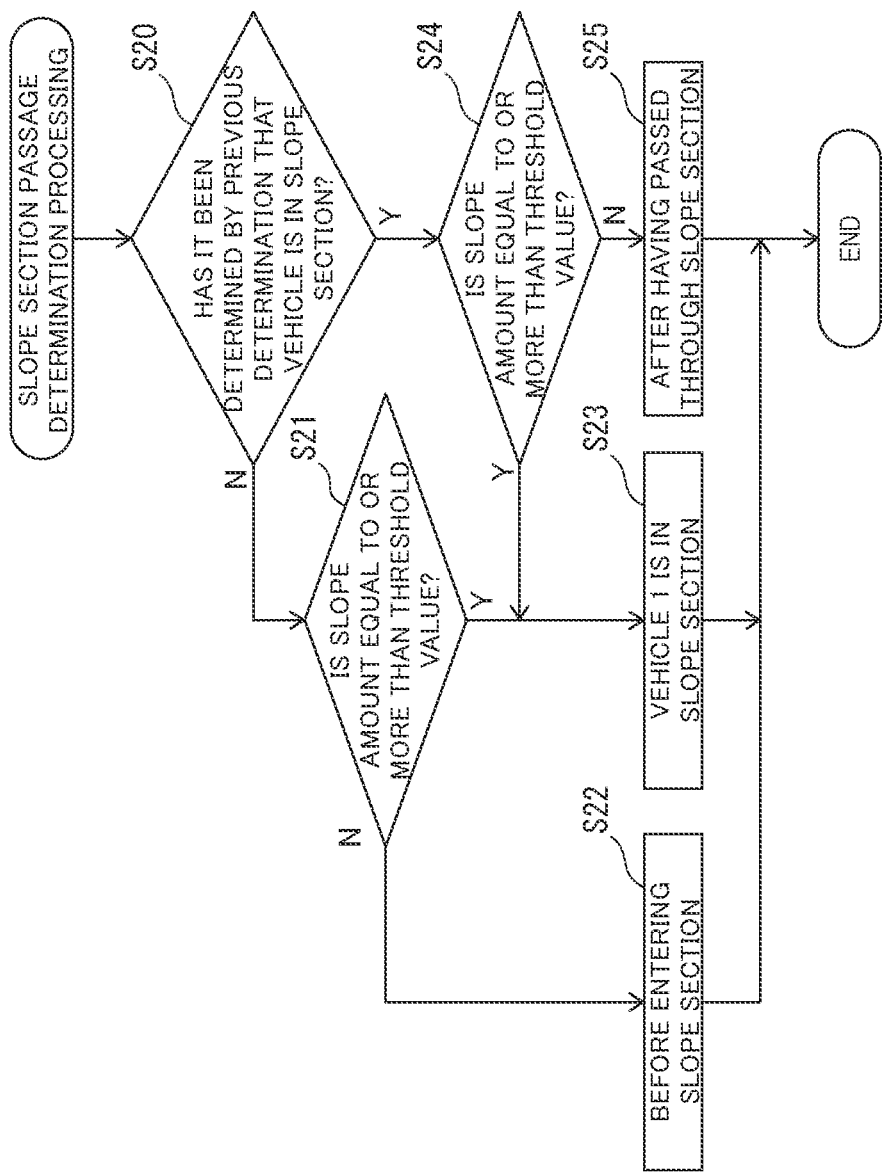
FIG. 8 is a flowchart illustrating one example of slope section passage determination processing.

With reference to FIG. 8, a description will be given of the slope section passage determination processing performed at step S5 of FIG. 7. At step S20, the selection unit 25 determines whether or not it has been determined that the vehicle 1 is in the slope section by the previous slope section passage determination processing. When it has been determined that the vehicle 1 is in the slope section (step S20: Y), the processing goes to step S24. When it has not been determined that the vehicle 1 is in the slope section (step S20: N), the processing goes to step S21.

At step S21, the slope detection unit 22 determines whether or not the slope amount of the traveling road of the vehicle 1 is equal to or more than a threshold value. Note that the threshold value may be set in accordance with whether or not the difference between the oblique distance and the horizontal distance due to the slope is within an allowable range. The threshold value may be, for example, two degrees. When the slope amount is equal to or more than the threshold value (step S21: Y), the processing goes to step S23. When the slope is less than the threshold value (step S21: N), the processing goes to step S22.

At step S22, the selection unit 25 determines that the vehicle 1 has not yet entered the slope section. Then, the processing is ended.

At step S23, the slope detection unit 22 determines that the vehicle 1 is in the slope section. Then, the processing is ended.

On the other hand, at step S24, the slope detection unit 22 determines whether or not the slope amount of the traveling road of the vehicle 1 is equal to or more than the threshold value. When the slope amount is equal to or more than the threshold value (step S24: Y), the processing goes to step S23. When the slope amount is less than the threshold value (step S24: N), the processing goes to step S25.

At step S25, the selection unit 25 determines that the vehicle 1 has already passed through the slope section. Then, the processing is ended.

Effects of First Embodiment (1) The imaging device 10 and the distance measurement device 11 that serve as a target detection sensor and the target position detection unit 20 detect the relative position of each target existing around the vehicle 1 relative to the vehicle 1. The movement amount estimation unit 21 estimates the movement amount of the vehicle 1. The target position accumulation unit 23 corrects the relative position on the basis of the movement amount of the vehicle 1, and accumulates as target position data. The imaging device 10 and the gyro sensor 14 that serve as a slope detection sensor and the slope detection unit 22 detect a slope of the traveling road of the vehicle 1. The selection unit 25 selects, from among the accumulated target position data, the target position data of one or more targets in a section up to the present position after having passed through the slope section. The position estimation unit 26 collates the selected target position data with map information indicating the position of the one or more targets on the map to estimate the present position of the vehicle 1.

Thus, even when the distance between the vehicle 1 and each target indicated by the target position data of the each target detected before passing through the slope section by traveling of the vehicle 1 in the slope section is longer than an actual horizontal distance, the target position data of the targets detected before passing through the slope section can be excluded from position estimation. This can suppress reduction in the accuracy of position estimation on the two-dimensional map due to the difference between the oblique distance and the horizontal distance in the slope section.

For example, when passing through a slope section and then entering an intersection, the self-position can be estimated on the basis of an accurate target position around the intersection without any distance error, thus improving estimation accuracy.

(2) The selection unit 25 selects the target position data of one or more targets around the present position of the vehicle 1, and the position estimation unit 26 collates the selected target position data with the map information. The target position data of the targets around the present position of the vehicle 1 have little accumulation of errors due to correction using the movement amount ΔP, and therefore tend to have high positional accuracy. Selecting the target position data of one or more targets around the present position of the vehicle 1 and using the data to estimate the position of the vehicle 1 can improve accuracy in the position estimation for the vehicle 1.

(Modifications)

To improve the accuracy of estimated positions and shorten processing time, the selection unit 25 may preferentially select, as the selected target position data, target position data of any of the targets after having passed through a slope section, and may exclude the rest thereof from the selected target position data. For example, the selection unit 25 may preferentially select, as the selected target position data, a target(s) whose angle between a straight line connecting the vehicle 1 and the target and a traveling direction of the vehicle 1 becomes larger.

In addition, for example, the selection unit 25 may exclude, from the selected target position data, a target(s) whose distance from the vehicle 1 is longer than a predetermined upper limit. Herein, the longer the distance between the target and the vehicle 1, the easier the slope section is found between the target and the vehicle 1, whereby estimation error of the movement amount ΔP easily increases. Accordingly, the upper limit of the distance between the target(s) and the vehicle 1 may be adjusted in accordance with an allowable range of a position estimation error due to the estimation error of the movement amount ΔP.

Second Embodiment

Next will be a description of a self-position estimation device 2 according to a second embodiment.

While traveling in a section having a slope amount continuously less than the threshold value, performing self-position estimation by using the target position data of targets in the section enables suppression of reduction in the accuracy of position estimation on the two-dimensional map due to the difference between the oblique distance and the horizontal distance.

Accordingly, the self-position of the vehicle 1 can be detected with high accuracy in each of a first section having a slope amount less than the threshold value in which the vehicle 1 traveled before entering the slope section and a second section having a slope amount less than the threshold value in which the vehicle 1 travels after passing through the slope section. Thus, a relative position between the self-position of the vehicle 1 estimated in the first section and the self-position of the vehicle 1 estimated in the second section can be calculated with high accuracy.

Accordingly, even when the distance between the vehicle 1 and each target indicated by the target position data of the each target in the first section is longer than an actual horizontal distance due to correction of the target position data by the movement amount ΔP estimated during traveling in the slope section, correction can be made by using the relative position between the self-positions estimated in the first and second sections.

The self-position estimation circuit 16 of the second embodiment corrects the target position data of the each target in the first section by using the relative position between the self-position estimated in the first section and the self-position estimated in the second section.

Figure 9:
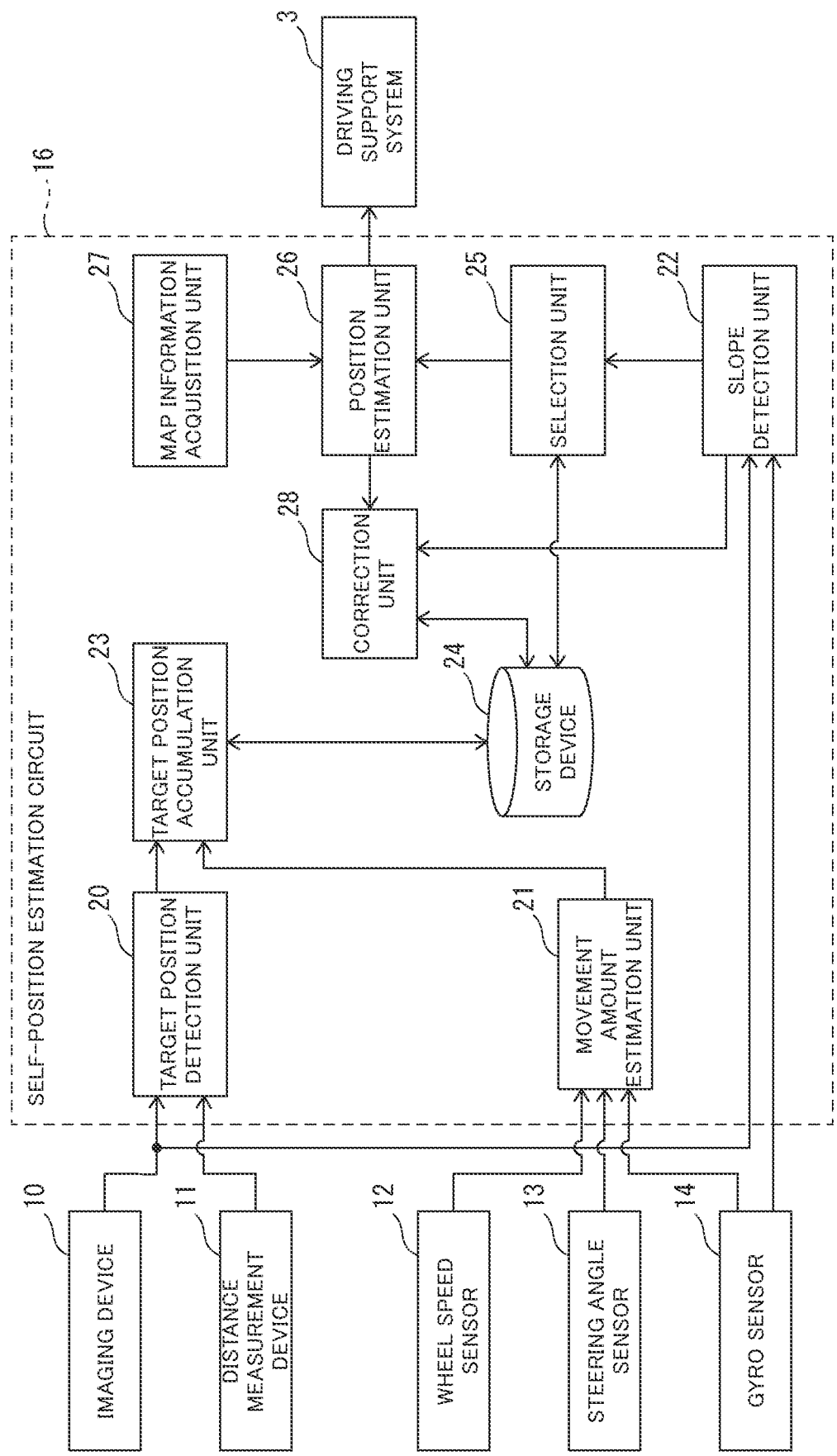
FIG. 9 is a block diagram of one example of the schematic structure of a self-position estimation circuit according to a second embodiment.

Reference will be made to FIG. 9. The self-position estimation circuit 16 includes a correction unit 28. The processor included in the self-position estimation circuit 16 executes a computer program stored in the storage device 24 to achieve function of the correction unit 28.

In the first section having a slope amount less than the threshold value where the vehicle 1 traveled before entering the slope section, the position estimation unit 26 collates the target position data of the targets in the first section with the map information to estimate a first position of the vehicle 1 before entering the slope section. The position estimation unit 26 outputs the first position to the driving support system 3 and the correction unit 28.

The correction unit 28 adds information of the first position of the vehicle 1 estimated in the first section to the target position data of the targets in the first section, and stores in the storage device 24.

In the second section having a slope amount less than the threshold value where the vehicle 1 travels after having passed through the slope section, the position estimation unit 26 collates the target position data of the targets in the second section with the map information to estimate a second position of the vehicle 1 after having passed through the slope section. The position estimation unit 26 outputs the second position to the correction unit 28.

The correction unit 28 corrects the target position data of the targets in the first section on the basis of a relative position between the first position and the second position.

After the correction of the target position data of the targets in the first section, the position estimation unit 26 collates the corrected target position data and the target position data of targets in the second section with the map information to estimate a second position of the vehicle 1 after having passed through the slope section.

The position estimation unit 26 outputs the second position estimated after the correction of the target position data to the driving support system 3. The object position estimation unit 26 adds information of the second position estimated after the correction of the target position data to the target position data of the targets in the second section, and stores in the storage device 24.

Figure 10:
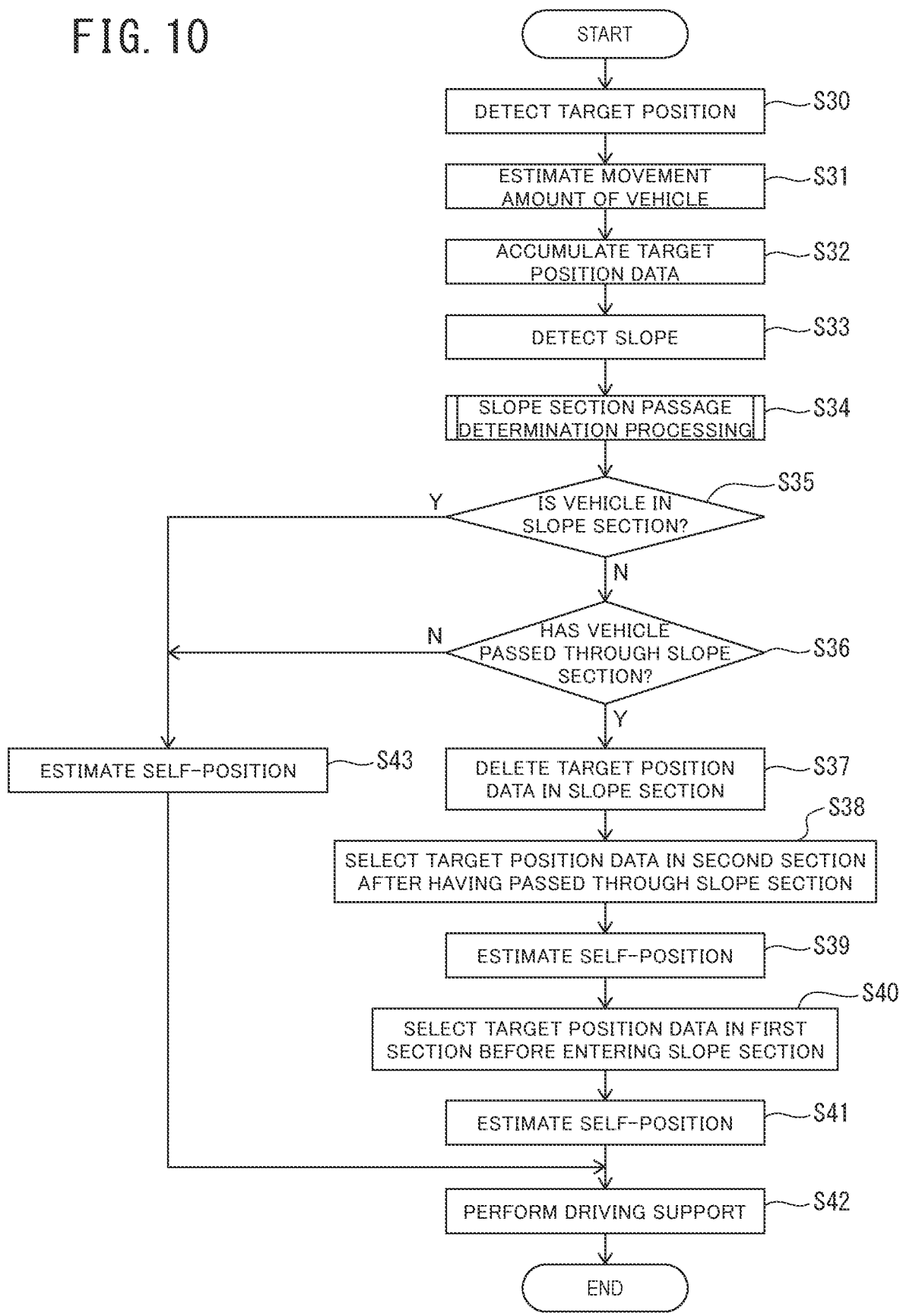
FIG. 10 is a flowchart illustrating one example of a self-position estimation method according to the second embodiment.

Reference will be made to FIG. 10. Pieces of processing of steps S30 to S34 are the same as those of steps S1 to S5 of FIG. 7.

At step S35, the selection unit 25 determines whether or not it has been determined by slope section passing determination processing that the vehicle 1 is in the slope section. When the vehicle 1 is in the slope section (step S35: Y), the processing goes to step S43. When the vehicle 1 is not in the slope section (step 35: N), the processing goes to step S36.

At step S36, the selection unit 25 determines whether or not it has been determined by the slope section passing determination processing that the vehicle 1 has passed through the slope section. When the vehicle 1 has passed through the slope section (step S36: Y), the processing goes to step S37.

When the vehicle 1 has not yet passed through the slope section (step S36: N), i.e., when the vehicle 1 has not yet entered the slope section, the processing goes to step S43.

At step S36, the selection unit 25 deletes the target position data of targets in the slope section from the storage device 24.

Specifically, the selection unit 25 selects, as the selected target position data, the target position data of targets other than those in the slope section (i.e., the target position data of targets before entering the slope section and targets after having passed through the slope section).

In other words, the selection unit 25 selects, as the selected target position data, the target position data of targets in the sections having a slope amount less than the threshold value, which are sections other than the slope section, without limiting to the target position data of the targets after having passed through the slope section. Note that it is unnecessary to select all the targets other than those in the slope section as the selected target position data. Only target position data necessary to enable estimation of the self-position of the vehicle 1 by collating with the map information acquired by the map information acquisition unit 27 may be selected.

At step S38, the selection unit 25 selects the target position data of the targets in the second section after having passed through the slope section.

At step S39, the position estimation unit 26 collates the target position data selected at step S38 with two-dimensional map information to estimate the second position of the vehicle 1.

At step S40, the correction unit 28 reads out, from the storage device 24, the information of the first position of the vehicle 1 estimated in the first section and stored in addition to the target position data of the targets in the first section before entering the slope section. The correction unit 28 corrects the target position data of the targets in the first section on the basis of a relative position between the first position and the second position.

At step S41, the position estimation unit 26 collates the target position data left in the storage device 24 (i.e., the target position data corrected at step S40 and the target position data of the targets in the second section) with the map information to estimate the second position of the vehicle 1 after having passed through the slope section. The correction unit 28 adds information of the second position of the vehicle 1 estimated at step S41 to the target position of the targets in the second section, and stores in the storage device 24.

Processing of step S42 is the same as the processing of step S10 of FIG. 7.

Processing of step S43 is the same as the processing of step S9 of FIG. 7. After step S43, the processing goes to step S42.

Effects of Second Embodiment

The position estimation unit 26 collates the target position data of the targets in the first section having a slope amount less than the threshold value with map information before entering the slope section to estimate the first position of the vehicle 1 before entering the slope section. Additionally, the position estimation unit 26 collates the target position data of the targets in the second section having a slope amount less than the threshold value with map information after having passed through the slope section to estimate the second position of the vehicle 1 after having passed through the slope section. The correction unit 28 corrects the target position data of the targets in the first section on the basis of the relative position between the first position and the second position.

The position estimation unit 26 collates the corrected target position data and the target position data of the targets in the second section with the map information to estimate the self-position of the vehicle 1.

In other words, the position estimation unit 26 collates, without limiting to the target position data of the targets in the second section after having passed through the slope section, the target position data of the targets in the sections having a slope amount less than the threshold value with the map information to estimate the self-position of the vehicle 1.

This can suppress reduction in the accuracy of position estimation on the two-dimensional map due to the difference between an oblique distance and a horizontal distance between the targets in the slope section.

In addition, since the target position data of the targets before entering the slope section can be utilized again, accuracy in the self-position estimation can be improved.

(Modifications)

When the vehicle 1 has passed through some undulations such as those found everywhere, the target position data of targets existing in the undulations do not have to be excluded from the selected target position data.

For example, the selection unit 25 may exclude, from the selected target position data, the target position data of targets in a slope section such as an entrance of a bridge or a highway, and does not have to exclude, from the selected target position data, for example, the target position data of targets existing in undulations having a slope amount of from 1 to 2 degrees and taking about from 2 to 3 seconds to pass through.

For example, when a section having a slope less than the threshold value does not continue for a predetermined length or longer, the selection unit 25 may select also the target position data of targets in the section as the selected target position data.

On the other hand, when a section having a slope less than the threshold value continues for a predetermined length or longer, the selection unit 25 may exclude the target position data of targets in the section from the selected target position data. In other words, the selection unit 25 selects, as the selected target position data, the target position data of targets in a section other than such a section, that have a slope less than the threshold value. The same applies to the first embodiment.

In this manner, when a section having a slope equal to or more than the threshold value continues for a predetermined length or longer, the selection unit 25 selects the target position data of targets in a section other than such a section, so that the target position data in the slope section that influence accuracy of the estimation of the self-position can be appropriately excluded.

The predetermined length may be set on the basis of a traveling time during which the vehicle 1 travels, for example, in a section having a slope equal to or more than the threshold value. For example, the predetermined length may be set to a length of 3 seconds or longer. Alternatively, the predetermined length may be set on the basis of the distance of a section having a slope equal to or more than the threshold value. For example, the predetermined length may be set to a length of 30 seconds or longer.

The predetermined length may be dynamically set to become shorter as the slope amount of the traveling road of the vehicle 1 becomes larger. This can suppress a measurement error due to the difference between the oblique distance and the horizontal distance to within a desired allowable range, regardless of the magnitude of the slope amount.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

REFERENCE SIGNS LIST

1: Vehicle
2: Self-position estimation device

3: Driving support system
10: Imaging device
11: Distance measurement device
12: Wheel speed sensor
13: Steering angle sensor
14: Gyro sensor
15: Acceleration sensor
16: Self-position estimation circuit
20: Target position detection unit
21: Movement amount estimation unit
22: Slope detection unit
23: Target position accumulation unit
24: Storage device
25: Selection unit
26: Position estimation unit
27: Map information acquisition unit
28: Correction unit

The invention claimed is:

1. A self-position estimation method comprising:
   detecting relative positions of targets existing around a moving body relative to the moving body, wherein the targets indicate traveling road boundaries;
   estimating, using odometry, a movement amount of the moving body;
   correcting the relative positions of the targets by moving the detected relative positions toward a direction opposite to a moving direction of the moving body by the estimated movement amount of the moving body and accumulating the corrected relative positions as target position data;
   detecting an amount of slope of a traveling road of the moving body;
   selecting, from among the accumulated target position data, the target position data of one or more targets in one or more sections where the amount of slope of the traveling road is less than a threshold value;
   estimating a present position of the moving body on an acquired map by collating the selected target position data with known positions of the targets on the acquired map, wherein the acquired map was created prior to and independent of the detection of the relative positions of the targets; and
   controlling at least one system of the moving body using the estimated present position of the moving body.

2. The self-position estimation method according to claim 1, wherein the target position data of one or more targets in a section up to the present position after having passed through a slope section where the amount of slope is equal to or more than the threshold value is selected to be collated with the map information.

3. The self-position estimation method according to claim 2, wherein:
   the target position data of one or more targets in a first section where the slope amount is less than the threshold value is collated with the known positions of the targets on the map before entering the slope section to estimate a first position of the moving body before entering the slope section;
   the target position data of one or more targets in a second section where the amount of slope is less than the threshold value is collated with the known positions of the targets on the map after having passed through the slope section to estimate a second position of the moving body after having passed through the slope section; and
   the target position data of the targets in the first section is corrected on a basis of a relative position between the first position and the second position.

4. The self-position estimation method according to claim 1, wherein:
   when a section where the amount of slope is equal to or more than the threshold value continues for a predetermined length or longer, the target position data of the target in a section where the amount of slope is less than the threshold value is selected to be collated with the map information; and
   when the section having the amount of slope equal to or more than the threshold value does not continue for the predetermined length or longer, the target position data of target in the section where the amount of slope is equal to or more than the threshold value is included in the target position data to be collated with the map information.

5. The self-position estimation method according to claim 4, wherein the predetermined length is set to be shorter as the amount of slope of the traveling road of the moving body is larger.

6. The self-position estimation method according to claim 1, wherein the target position data of one or more targets around the present position of the moving body is selected to be collated with the known positions of the targets on the map.

7. A self-position estimation device comprising:
   a target detection sensor configured to detect relative positions of targets existing around a moving body relative to the moving body, wherein the targets indicate traveling road boundaries;
   a wheel speed sensor configured to detect a wheel speed of the moving body;
   a gyro sensor configured to detect an amount of slope of a traveling road of the moving body; and
   a self-position estimation circuit configured to estimate a movement amount of the moving body using a detection result of the wheel speed sensor, correct the relative positions of the targets detected by the target detection sensor by moving the relative positions of the targets toward a direction opposite to a moving direction of the moving body by the estimated movement amount, select, from among the corrected relative positions, target position data of one or more targets in one or more sections having an amount of slope less than a threshold value, and estimate a present position of the moving body on an acquired two-dimensional map by collating the selected target position data with known positions of the targets on the acquired two-dimensional map,
   wherein the estimated present position of the moving body is used to control at least one system of the moving body.

8. The self-position estimation method according to claim 1, wherein the travelling road boundaries comprise at least one of a lane marking, a curb, a shoulder, or a guardrail.

9. A self-position estimation method comprising:
   detecting relative positions of targets existing around a moving body relative to the moving body, wherein the targets indicate traveling road boundaries;
   correcting the relative positions of the targets by moving the detected relative positions of the targets toward a direction opposite to a moving direction of the moving body by an estimated movement amount of the moving body since the relative positions were detected;

detecting an amount of slope of the traveling road of the moving body;

ignoring or deleting the corrected relative positions of the targets that correspond to sections where the amount of slope of the road on which the moving body is traveling is greater than or equal to a threshold value;

matching the remaining corrected relative positions of the targets with known positions of the targets on a map acquired from a map database to estimate a present position of the moving body on the map, wherein the map was created prior to and independent of the detection of the relative positions of the targets; and controlling at least one system of the moving body based on the estimated present position of the moving body.

10. The self-position estimation method of claim 9, wherein ignoring or deleting the corrected relative positions of the targets that correspond to sections where the amount of slope of the moving body on the traveling road is greater than or equal to the threshold value comprises:

deleting the corrected relative positions of the targets that correspond to sections where the amount of slope of the moving body on the traveling road is greater than or equal to the threshold value.

11. The self-position estimation method according to claim 1, wherein the travelling road boundaries comprise at least one of a curb, a shoulder, or a guardrail.

* * * * *